July 15, 1969  HIROSHI FUJITA  3,456,093
GRAVITY TYPE WELDER

Filed July 11, 1967

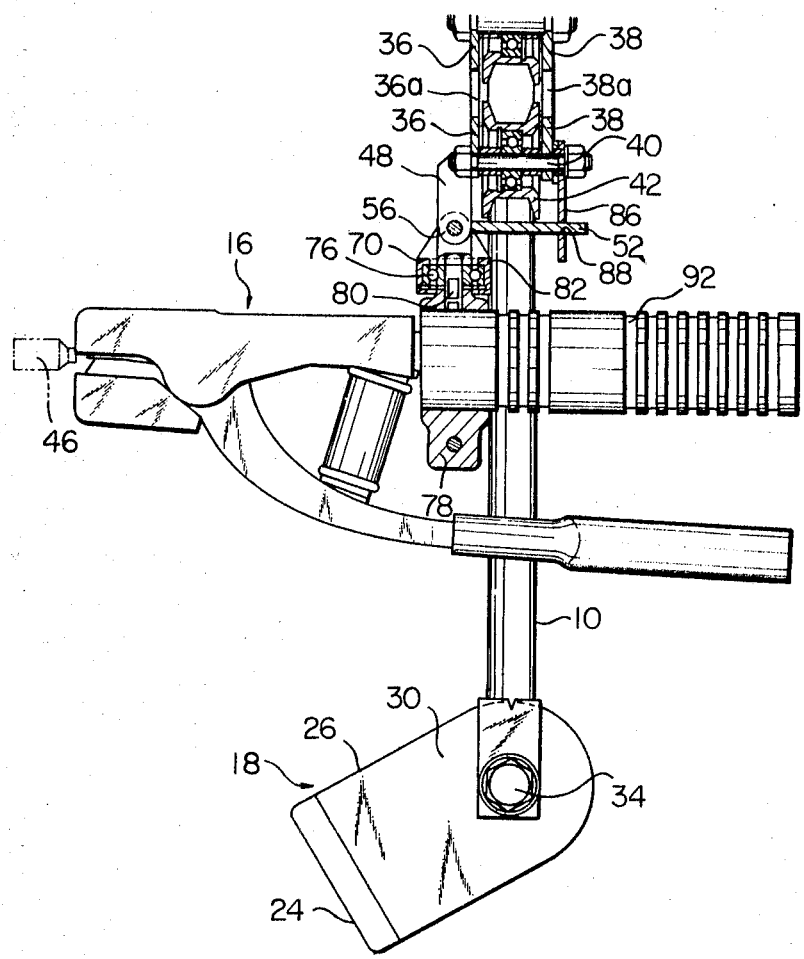

United States Patent Office 3,456,093
Patented July 15, 1969

3,456,093
GRAVITY TYPE WELDER
Hiroshi Fujita, Narashino, Japan, assignor to Yawata Welding Electrode Co., Ltd., Tokyo-to, Japan, a Japanese corporation
Filed July 11, 1967, Ser. No. 652,453
Claims priority, application Japan, Sept. 22, 1966, 41/62,244
Int. Cl. B23k 9/00
U.S. Cl. 219—130                    8 Claims

ABSTRACT OF THE DISCLOSURE

A gravity type welder wherein a slider assembly on which the electrode holder is carried, is mounted for sliding travel on a pair of parallel rail members, the rail members being pivoted at their lower ends to a base which can be positioned to support the rail members in planes perpendicular to the ground for welding along a central welding line, the base also being tiltable to either left or right inclined positions for welding at locations to the left or right of the central welding line position, the upper ends of the rail members being connected to a bipod support which maintains the upper ends a height above the base enabling the force of gravity to pull the slider assembly in the direction of the base as the welding operation proceeds. As the slider assembly moves downwardly on the rail members in the course of the welding operation, the electrode holder is maintained in a detented position in opposition to a biasing force applied thereto by a loop in the power cable adjacent the holder which tends to swing the electrode holder away from the welding line. A selectively positionable cam sleeve connected with one of the rail members is employed to disengage the electrode holder detent means, which is carried on the slider assembly, at the end of the welding operation thus allowing the biasing force of the power cable loop to swing the electrode holder away from the welding line automatically breaking the welding arc.

Background of the invention

Gravity type welders as known in the art are generally comprised of two rail members arranged parallel with each other and interconnected at their upper and lower ends so as to constitute a frame of rectangular form with support for the frame usually being provided by clamping one corner of the lower end of the frame to a base. This arrangement has often resulted in the occurrence of objectionable deviations in the angle formed by the welding line and electrode due to vibrations and impacts incidental to the welding operation. There has also been a tendency for the angle of inclination of the rail members to show deviation when the welding position was shifted during welding to a right or left hand operation. Another disadvantage of prior art gravity welders is that they are susceptible to erratic sliding performance of the slider carrying the electrode holder. This especially is true when a thin, elongated welding electrode is used, since the electrode flexes and prevents the slider from sliding downwardly at a uniform rate during welding, causing same to slide in a manner that there occurs a rush of accelerated travel after the front end of the electrode had melted in substantial quantity. Good welding performance requires the slider to slide smoothly downwardly at a rate concurrent with the rate at which the welding electrode is melted. Poor slider performance of prior art gravity welders also is attributable to the fact that the electrode holder is usually supported for travel on only one of the side rail members.

The present invention on the other hand overcomes the above mentioned shortcomings of prior art gravity welders and is characterized by its suitability for center line welding operations as well as welding operations to the left and right of the center line. A further feature of the gravity welder of the present invention is the inclusion of means which functions to automatically break the welding arc at the end of the welding operation.

Summary of the invention

The gravity welder of the present invention is comprised of a pair of parallel rail members on which is supported a slider assembly, the latter in turn providing support for the electrode holder which extends centrally between the rail members. The rail members are pivoted at their lower ends to a base which has a central ground engaging surface as well as symmetrically arranged left and right inclined ground engaging surfaces. Thus the welder is adapted to be positioned with facility for left or right hand welding operations in addition to center line welding operations. The upper ends of the rail members are interconnected by a transverse bar to which is pivoted a bipod support thus providing means for positioning the upper ends of the rail members a distance above the base so the force of gravity pulls the slider assembly in the direction of the base during the welding operations. The slider assembly is provided with a central opening through which the power cable extends thus allowing for the latter to transit a loop the effect of which is to tend to swing the electrode holder away from the welding line. However, during the normal course of welding, the electrode holder is held in a detented position by a pawl engaging a tongue extension of the bracket with which the electrode is connected to the slider assembly. The pawl which is swingably connected to the slider assembly is held in engaged position by a spring, but at the end of the welding operation the pawl, following the sliding advance of the slider assembly, is engaged by a cam sleeve carried on one of the rail members causing disengagement of the pawl thereby allowing the weight of the electrode holder handle and the biasing effect of the power cable loop to swing the electrode holder away from the welding line interrupting the welding arc.

The invention accordingly comprises the features of construction, combination of elements, and arrangement of parts, which will be exemplified in the construction hereinafter as set forth and the scope of the invention will be indicated in the claims.

Brief description of the drawings

A fuller understanding of the nature and objects of the invention will be had from the following detailed description taken in conjunction with the accompanying drawings in which:

FIGURE 4 is a left side view in elevation of the welder, the electrode holder being shown connected to the slider assembly and the sliding components of the welder being shown in section.

Throughout the description, like reference numerals are used to denote like parts in the drawings.

Description of the preferred embodiment

Figure 1:
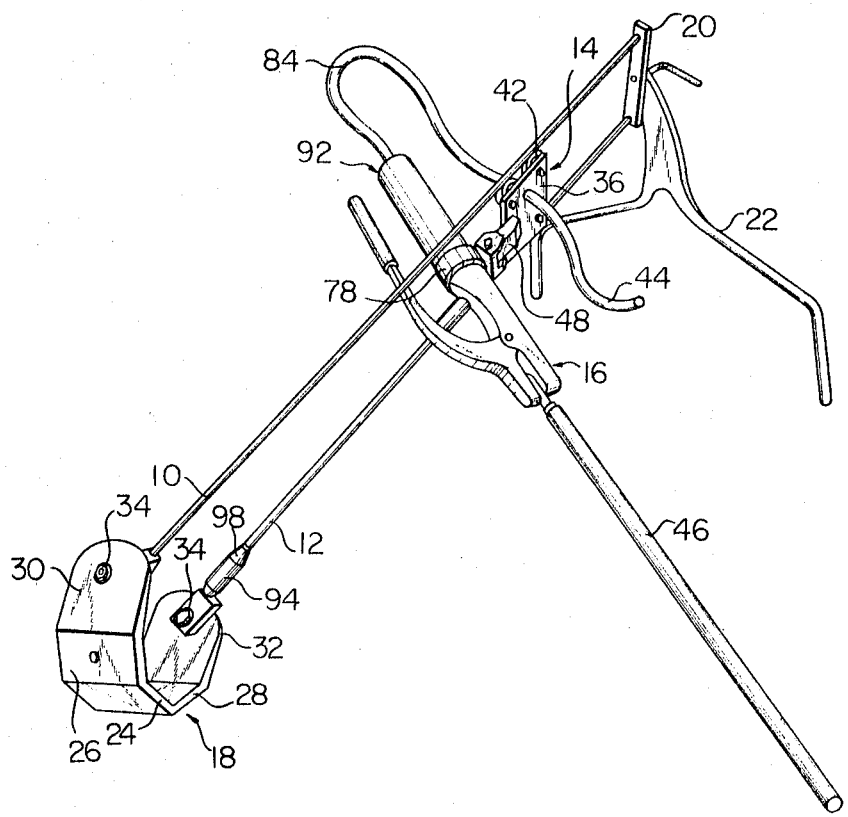
FIGURE 1 is a perspective view of a gravity type welder constructed in accordance with the principles of the present invention.

The general structural arrangement of the gravity welder of the present invention is best shown in FIGURE 1 from which it will be noted the welder comprises a pair of parallel rail members 10 and 12, a slider assembly 14 mounted for sliding travel on the rail members, an electrode holder 16 connected with the slider assembly, a base 18 to which the lower ends of the rail members are connected, a cross bar 20 connecting together the upper ends of the rail members, and a bipod support 22 pivoted to the cross bar and provided for the purpose of maintaining the upper ends of the rail members elevated a distance above the base 18.

Figure 2:
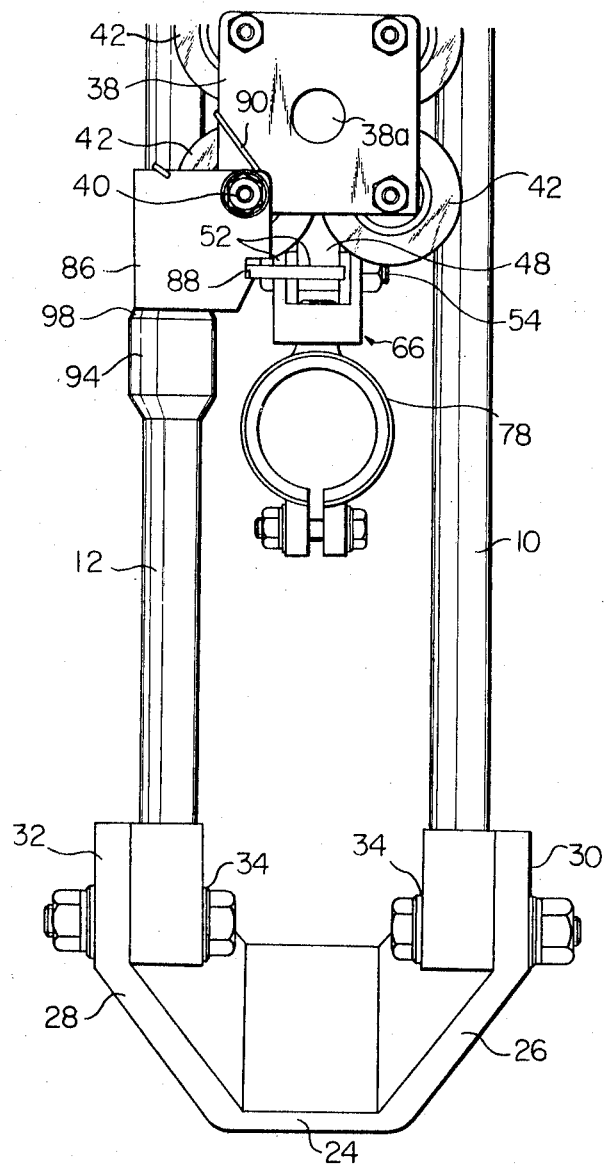
FIGURE 2 is a partial rear elevational view of the welder shown in FIGURE 1, the electrode holder and upper portions of the rail members not being shown.

Base 18 in a preferred form has a generally channel shaped section as shown, having a lower central, flat ground engaging section 24 and symmetrically arranged left and right ground engaging sections 26 and 28 which extend upwardly inclined from the central section and which terminate respectively in upper sides 30 and 32, the latter extending substantially perpendicular to central section 24 (FIGURE 2). The respective ground engaging sections have flat outer surfaces providing that according to the positioning of the base, the welder is positioned for centerline welding when the base rests on central section 24 and for left and right hand welding when the base is tilted to rest on the corresponding ground engaging sections 26 and 28. The lower ends of the rail members 10 and 12 are pivoted to the base upper sides 30 and 32 as at 34 providing that the rail members can be pivoted in planes perpendicular to the ground with the base resting on central section 24 and in planes inclined to said perpendicular plane when the base is resting on sections 26 and 28. It is not essential that the ground engaging surfaces of the base be flat surfaces since the base could be comprised of other forms of supporting surfaces as for example, support feet. However, the feet associated with each section should have ends arranged in planar alignment and the left and right ground engaging feet should be symmetrical of the central section feet.

Figure 3:
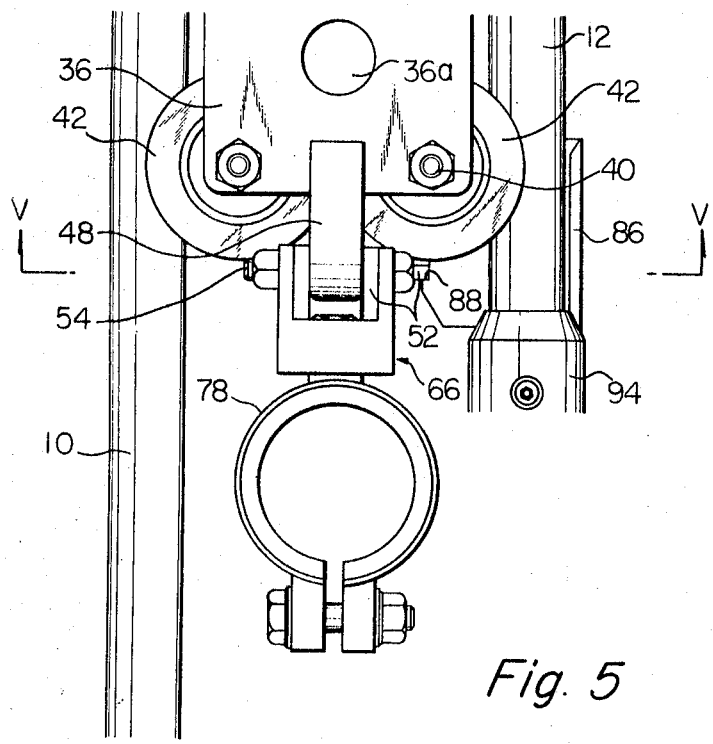
FIGURE 3 is a partial front elevational view similar to FIGURE 2 except the base is not shown.
Figure 5:
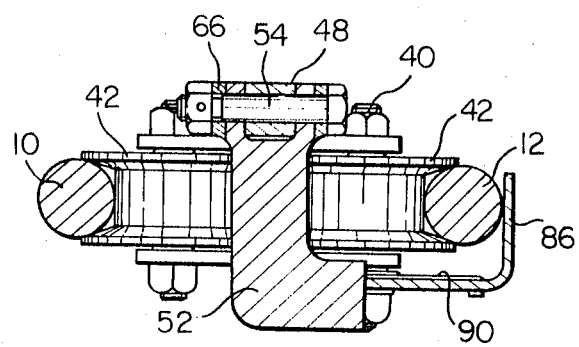
FIGURE 5 is a sectional view as taken on the line V—V in FIGURE 3.
Figure 6:
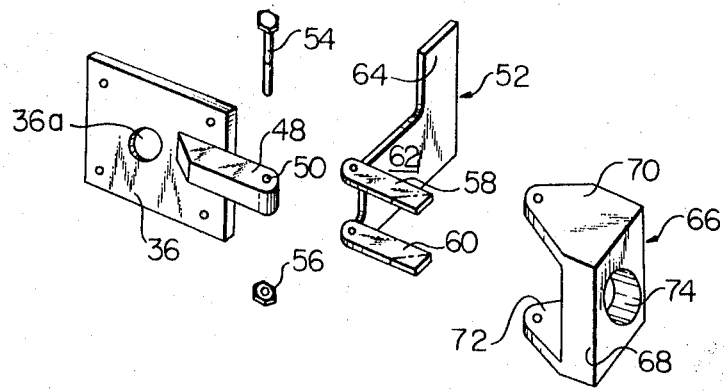
FIGURE 6 is an exploded perspective view of a reverser assembly used for supporting the electrode holder from the slider assembly and which cooperates with a pawl to maintain the electrode holder non-pivotable on the slider assembly against the biasing force of the looped power cable during the course of the welding operations.

As shown in FIGURES 2 to 4, the slider assembly 14 is comprised of a pair of spaced apart plates 36 and 38 connected in known manner with nuts and bolts, each bolt 40 serving as a shaft for mounting one of the guide rollers 42. The guide rollers 42 are arranged to function in pairs each associated with and riding on one of the rail members and provide means with which the assembly slides along the rail members under the influence of the force of gravity. The plates 36 and 38 are provided with aligned openings 36a and 38a which serve to receive the power cable 44 with which welding current is supplied to the welding electrode 46. As will appear later in the description, the leading of the power cable 44 through the slider assembly serves an important function. Plate 36 together with the other components shown in FIGURE 6 comprise, a reverser assembly serving the dual function of supporting the electrode holder and providing the means with which the electrode holder 16 can be pivoted away from the welding line at the end of the welding operation to break the welding arc. As shown in FIGURE 6, the reverser assembly includes support arm 48 which is connected to the outer face of plate 36 and has a bore hole 50 with which bracket 52 is pivoted to the support arm 48 by means of the nut and bolt 54 and 56. Bracket 52 has a pair of flat parallel arranged arms 58 and 60 and an elongated plate 62 extending laterally outwardly from the arms, the plate 62 having a transversely extending tongue 64 formed at the terminal end as shown. Also mounted on bolt 56 and girding the bracket 52 is a support frame 66 comprised of an enlarged lower body 68 and upper sides 70 and 72, the lower body 68 being bored as at 74 to receive a ball bearing assembly 76 extending upwardly from support collar 78 (FIGURE 4). Support collar 78 is adapted to receive the electrode holder 16 and has a pin 80 therein connected to the inner race 82 of the ball bearing assembly thus providing for swinging the electrode holder 16 in limited areas about an axis perpendicular to the axis of the bolt 56. As will be noted, the support arm 48 is located centrally on plate 36 and hence the electrode holder is supported from the slider assembly in a manner wherein it extends centrally between the rail members.

Figure 7:
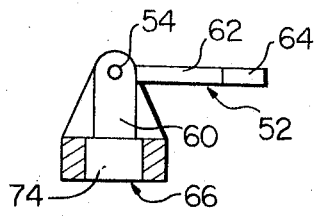
FIGURE 7 is a side elevational view partly in section of a support bracket comprising part of the assembly shown in FIGURE 6.
Figure 8:
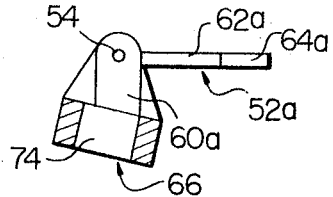
FIGURE 8 is a view similar to FIGURE 7 showing a modified form of the support bracket.

As can be seen in FIGURE 7, the bracket 52 and support frame 66 move as a unitary structure on pivot 56. This occurs because the lower edges of arms 58 and 60 uniformly engage the upper surface of lower body 68 of support frame 66 at locations adjacent bore 74. Unitary movement is necessary to provide a detent means for maintaining the electrode holder in a detented position in a manner as will appear later. FIGURE 8 illustrates an alternate construction of bracket 52a wherein the arms 58a and 60a thereof have angled lower edges which hold the support frame inclined with respect to elongated plate 62a. This facilitates effecting variations in the angle at which the electrode 46 confronts the welding line for determining electrode manipulation ratio (the ratio of the length of weld lead to the length of electrode melted).

As was mentioned, the reverser assembly is used to maintain the electrode holder 16 is a detented position during the course of normal welding operations in opposition to the biasing effect of the loop 84 in the power cable 44 that tends to swing the electrode holder away from the welding line. As can be best noted from FIGURE 2, a J section pawl 86 is pivoted to one corner of plate 38 of the slider assembly, the hook of the J girding a portion of rail member 12. The pawl 86 is also provided with a detent notch 88 and is maintained under the bias of a torsion spring 90 so that in the normal course of welding, the detent notch engages the tongue 64 of bracket 52. Thus the biasing force of the power cable loop 84 has no effect on the positioning of the electrode holder which holds the electrode directed at the welding line. On the other hand, at the end of the welding operation, the breaking of the welding arc is accomplished with facility by employing the biasing force of the cable loop as well as the weight of the handle 92 of the electrode holder. As can be seen in FIGURE 2, a selectively positionable cam sleeve 94 is slidable on rail member 12. Depending upon the point of termination of the welding operation, the cam sleeve 94 is locked in a particular position so that when the slider assembly has slid down the rail members the requisite distance, the leading edge of the pawl 86 will engage the inclined camming surface 98 of the cam sleeve and the pawl will be caused to pivot in a clockwise direction as viewed in FIGURE 2, releasing the tongue 64 from the detent notch 88. As a consequence, of the latter, the bias of the power cable loop and the weight of the handle of the electrode holder will pivot the electrode holder in a clockwise direction about the axis of bolt 56 as viewed in FIGURE 4, swinging the holder away from the welding line and breaking the welding arc.

In welding with the gravity welder of the present invention, the welder is set down on the ground with the base 18 resting on one of the ground engaging surfaces. If the welder is used for center line welding, the base is positioned with central section 24 resting on the ground. As used herein, "center line welding" is intended to mean welding a seam lying substantially in a plane perpendicular to the ground whether said seam extends in a vertical, horizontal or inclined direction. The bipod 22 is then set down on the ground or other surface to hold the upper ends of the rail members a distance above the base. The slider assembly is then raised up to a position corresponding to that wherein the welding electrode confronts the start of the welding line. The electrode holder is then swung about bolt 56 if required to engage it in its detented position. Cam sleeve 94 is set in a selected position corresponding to the end of the welding line, and the welding operation is commenced. As the welding proceeds, gravity will pull the slider assembly downwardly thereby advancing the welding electrode along the welding line. When the pawl 86 engages the cam sleeve 94 at the end of the operation, the electrode holder will be swung away from the welding line breaking the welding arc in the manner previously described. If the welding operation involves welding seams to the left or right of the center line position, the welder is tilted to support it on either the left or right ground engaging surfaces.

From the foregoing description, it will be appreciated that the welder of the present invention provides a number of advantages over prior art gravity welders. For example, the slider assembly is supported on two rail members instead of one so that the weight of the electrode holder is distributed to each. Furthermore, the looping of the power cable through the slider assembly creates a biasing force in the cable that can be employed to break the welding arc at the end of the welding operation.

It will be thus seen that the objects set forth above, among those made apparent from the preceding description, are efficiently attained, and since certain changes can be made in the above construction and different embodiments of the invention could be made without departing from the scope thereof, it is intended that all matter contained in the above description or shown in the accompanying drawing shall be interpreted as illustrative and not in a limiting sense.

What is claimed is:

1. In a welder of the gravity type wherein the force of gravity is utilized to advance an electrode along a welding line in the course of the welding operation,
   an electrode holder,
   a power cable connected with one end of said electrode holder, the other end of the electrode holder being adapted to hold the electrode,
   a pair of parallel rail members,
   a slider assembly supported for sliding travel on said rail members, said slider assembly including means for supporting the electrode holder centrally between said rail members with the electrode extended in the direction of the welding line, said power cable extending in a loop from said electrode holder and through said slider assembly, said loop being adapted to apply a biasing force to said electrode holder tending to swing it away from the welding line,
   detent means for holding said electrode holder in a latched position in opposition to said biasing force during the course of the welding operation,
   a base, said rail members being pivoted at their lower ends to said base, said base having a central ground engaging surface and right and left ground engaging surfaces for positioning said rail members for welding operations along corresponding welding lines,
   means connected with the upper ends of said rail members for maintaining said upper ends a selected height above said base whereby graivty exerts a force on said slider assembly for sliding it in the direction of said base during the welding operation, and
   means operable in response to movement of said slider assembly a predetermined distance in the direction of said base for releasing said detent means whereby the biasing force of the loop in said cable swings said electrode holder away from the welding line interrupting the welding arc.

2. The welder of claim 1 wherein the left and right ground engaging surfaces are arranged symmetrically of said central ground engaging surface and extend inclined upwardly therefrom.

3. The welder of claim 1 wherein said slider assembly comprises a pair of parallel spaced plates, and rollers supported rotatably between said plates, said rollers engaging said rail members, the means for supporting the electrode holder including a support arm fixed to one of said plates, a frame pivoted to said support arm, and a collar connected with said frame and receiving the electrode holder.

4. The welder of claim 3 wherein said frame is provided with a bore opening, a ball bearing assembly received in said bore opening, said collar having a pin connected with said ball bearing assembly whereby said collar can be pivoted about an axis perpendicular to the axis about which said frame pivots.

5. The welder of claim 3 wherein said pair of plates are provided with aligned central openings for receiving said power cable.

6. The welder of claim 3 wherein the detent means for holding the electrode holder against the biasing force of said loop comprises a bracket pivoted to said support arm and having a laterally extending tongue, a pawl pivoted to the other of said plates and having a detent notch engageable with said tongue and, a spring engaged with said pawl and effective to maintain said detent notch in engagement with said tongue, said bracket being operatively coupled with said frame to pivot unitarily therewith.

7. The welder of claim 6 wherein said pawl has a portion girding one of said rail members, the means for releasing said detent means comprising a cam sleeve selectively positionable on said one rail member and having a camming surface thereon, the portion of said pawl which girds said one rail member being engageable with said camming surface for pivoting said pawl in operation to the force of said spring whereby said tongue can be disengaged from said detent notch.

8. The welder of claim 1 wherein the means for maintaining the upper ends of said rail members a height above said base comprises a bar interconnecting said upper ends, and a bipod support pivoted to said bar.

References Cited
UNITED STATES PATENTS

| | | | |
|---|---|---|---|
| 2,421,095 | 5/1947 | Tyrner | 219—130 |
| 2,481,163 | 9/1949 | Setzler | 219—130 |

JOSEPH V. TRUHE, Primary Examiner

C. L. ALBRITTON, Assistant Examiner